(12) United States Patent
Harshfield

(10) Patent No.: US 7,966,318 B2
(45) Date of Patent: Jun. 21, 2011

(54) COMPRESSED DATA STORAGE TO PROVIDE RECENT AND SUMMARY DATA

(75) Inventor: James Daniel Harshfield, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 292 days.

(21) Appl. No.: 11/942,863

(22) Filed: Nov. 20, 2007

(65) Prior Publication Data

US 2009/0132567 A1    May 21, 2009

(51) Int. Cl.
    *G06F 17/30* (2006.01)
(52) U.S. Cl. ......... 707/722; 707/688; 707/736; 707/754
(58) Field of Classification Search .................. 707/723, 707/722
    See application file for complete search history.

(56) References Cited

U.S. PATENT DOCUMENTS

| | | | |
|---|---|---|---|
| 2002/0007359 A1 | 1/2002 | Nguyen | |
| 2002/0191692 A1* | 12/2002 | Fallon et al. | 375/240 |
| 2007/0063866 A1* | 3/2007 | Webb | 340/870.02 |
| 2009/0313056 A1* | 12/2009 | Beekhuis | 705/7 |

FOREIGN PATENT DOCUMENTS

WO    02/39310 A    5/2002

OTHER PUBLICATIONS

"Mark VIe Control System Guide vol. I", 2005, General Electric.*
"AWEA—Electrical Guide to Utility Scale Wind Turbines", Mar. 2005, American Wind Energy Association.*
"Mark VIe Control System Guide—vol. I", 2005, General Electric.*
"Mark VIe Control for Industrial Steam Turbines", 2005, General Electric.*
"Mark VIe Gas Turbine Control for Retrofit Applications", Jun. 7, 2004, General Electric.*

* cited by examiner

*Primary Examiner* — Charles Kim
*Assistant Examiner* — Sheryl Holland
(74) *Attorney, Agent, or Firm* — McNees Wallace & Nurick LLC

(57) ABSTRACT

The present invention is related to data storage and transmission. Data is compressed and stored by a controller computer instead of having a client computer gather, compress and store the data. This allows for data to be retrieved from the data stores and displayed for user retrieval, even when communication failures have occurred.

20 Claims, 1 Drawing Sheet

COMPRESSED DATA STORAGE TO PROVIDE RECENT AND SUMMARY DATA

FIELD OF THE INVENTION

The present invention is directed to a web interface that includes the display of historical data from a compressed data store. More specifically, the present invention is directed to a method and system for storing historical data and making it available for webpage display.

BACKGROUND OF THE INVENTION

Computer systems store and transfer data as a part of basic routine operation. In computer networks that act as data transfer communication links by allowing individual systems to transfer data to other systems in the network, some systems may store particular data while other systems in the same network may store different data.

A network permits larger volumes of data storage since many systems are capable of storing and managing the data as compressed data. However, when an interruption or failure of the network occurs, the data transfer between the various systems is disrupted. Thus, during an interruption or failure, each system is unable to access the data managed by the other systems.

Therefore, what is needed is a method and system for storing and retrieving compressed data on a controlling computer system instead of storing data on a networked system. Further, what is needed is a data storage system that can operate during communication failures.

SUMMARY OF THE INVENTION

A first aspect of the present invention includes a data storage system including a controller used to gather and compress data having an online operation and offline operation, a display configured to display the compressed data and a processor disposed in the controller, the processor having a plurality of data stores to store the compressed data from the controller. The controller, display and processor are in communication with each other and the compressed data is stored in the controller so that it will be available when the communication between the controller and display is operating offline.

Another aspect of the present invention includes a data storage method including the steps of providing a controller and a display in direct communication with the controller, storing a data set at a predetermined rate and in predetermined increments in the controller and compressing the data set into at least one manageable data store. The method also includes managing the data stores to provide current and recent data, displaying the at least one data store on the display at a user request and communicating data between the controller and display when the communication between the controller and display is online.

An advantage of an embodiment of the present invention is that the system provides retrievable data even during communication failures because the data is stored in the controlling computer rather than in various systems throughout a network.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
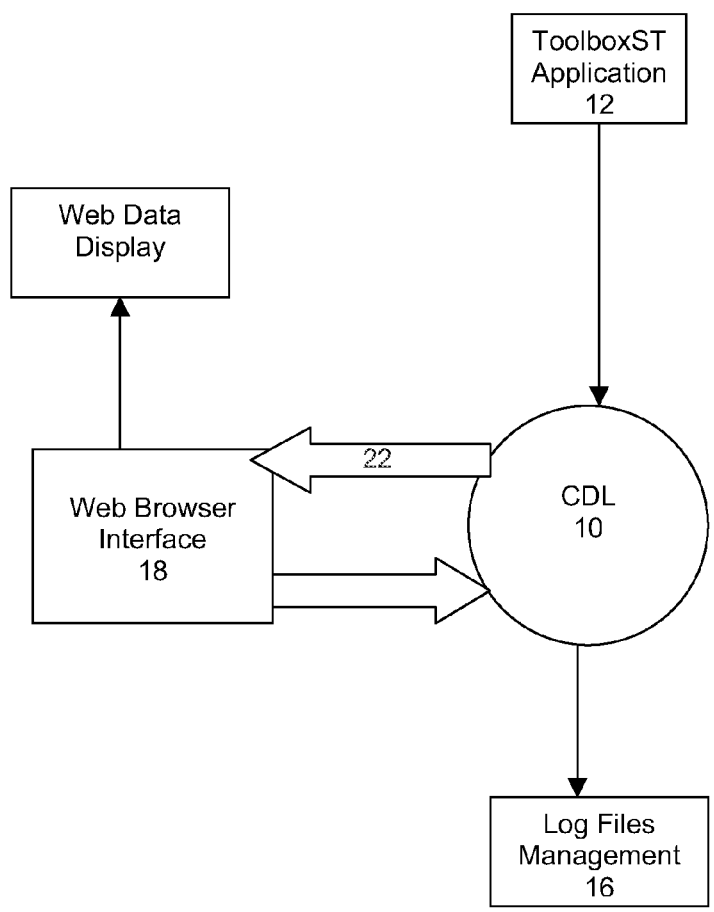
FIG. 1 is a flow chart diagram of the process of the present invention.

The present invention is related to data storage and transmission. Data is gathered, compressed and stored by a controlling computer instead of being stored in many systems throughout a network system.

FIG. 1 illustrates the schematic process of data storage according to the present invention. The data storage method and system may include a controlling computer with a Compressed Data Log or CDL 10, or other similar data storage device. The CDL 10 stores data input from certain specified data variables and calculates statistical summary information therefrom, which is made available to clients when requested. The summary information provided includes, but is not limited to, average, standard deviation, minimum and maximum values. The present invention includes having this statistical summary information stored and displayed on a webpage display format.

The data is stored and maintained in the CDL 10, which may be configured by a TOOLBOXST application 12. Marketed by General Electric Company, TOOLBOXST is a software package for configuring control systems, exciters, and drives. The TOOLBOXST program 12 configures the data gathered by the CDL 10 with a compresseddatalog.pcode file name and redsymboltable.pcode file name. The CDL 10 then maintains and manages the log files 16, which are separate files for the summary information. The log files 16 are created and deleted by the controlling computer at predetermined storage times and intervals. A user interfaces with the controlling computer through a web browser interface 18. A web browser request for data is made through the web browser interface for specific information, such as time start, time end, and variable names to the CDL 10. The CDL 10 retrieves the data from the log files 16. The data is then transferred in an .xml format to the web browser interface 18 by process 22.

In the exemplary embodiment, the log files 16 may include two separate data stores. In alternative embodiments, the log files 16 may include one or more than the separate data stores. The first data store is the 10 minute average compressed historical data, known as the "MinAna" data. This data store includes data that is averaged over a 10-minute time interval, or interval as configured, and stored for easy retrieval. The second data store available is the one-second production data, known as the "SecResolution" data. This data is captured, stored, and time tagged at a one hertz rate in the data store. The data is stored with a name, value, and timetag for easy retrieval. Typically only twenty-four hours of SecResolution data is maintained in the second data store. While two data stores are described in this exemplary embodiment, it is known by those skilled in the art that more or less than two data stores may be used with the present invention.

A user interfaces with the CDL 10 through a web browser interface and requests data, causing a command to be sent to the CDL 10. The information necessary to build the web page is made available by making a read call (Io_Read( )) to the CDL to obtain the data formatted from the log files 16.

Configuration files in the log file 16 are required to configure the CDL 10 process. These configuration files contain a definition of the variables used for compressed data collection. In addition, the configuration of the process allows a user to specify the total number of days for which CDL 10 will attempt to maintain the compressed data history. The CDL 10 will always maintain data history for this configured period of time provided that adequate storage space exists in the log file 16. If the storage space for the data history exceeds the percentage of the log file directory 16 that the used has allocated, older compressed data histories will be deleted to free space for new data. The code file 16 will also configure the collection interval duration in minutes increments.

Table 1 provides examples of several data points that may be logged using the CDL 10 system:

TABLE 1

| Ch | Signal |
|---|---|
| 01 | Blade 1, Actual Value |
| 02 | Blade 1, Set Value |
| 03 | Blade 2, Actual Value |
| 04 | Blade 2, Set Value |
| 05 | Blade 3, Actual Value |
| 06 | Blade 3, Set Value |
| 07 | Channel 30 |
| 08 | Current Phase A |
| 09 | Current Phase B |
| 10 | Current Phase C |
| 11 | DI1 Main |
| 12 | DI1 Top |
| 13 | DI2 Main |
| 14 | DI2 Top |
| 15 | DI3 Top |
| 16 | DI4 Top |
| 17 | Digital 1 |
| 18 | Digital 2 |
| 19 | DO1 Main |
| 20 | DO1 Top |
| 21 | DO2 Main |
| 22 | DO2 Top |
| 23 | Drive Train Accel |
| 24 | Gen./Gearbox Speed |
| 25 | Generator Speed |
| 26 | High Speed Running # |
| 27 | Nacelle Position |
| 28 | Nacelle Revolution |
| 29 | N-Set 1 |
| 30 | N-Set 2 |
| 31 | Operating State |
| 32 | Park Power |
| 33 | Power |
| 34 | Power Factor |
| 35 | Power Factor, Set Value |
| 36 | Reactive Power |
| 37 | Reserve 4 |
| 38 | Reserve 5 |
| 39 | Reserve 6 |
| 40 | Reserve 7 |
| 41 | Reserve 8 |
| 42 | Rotor Speed |
| 43 | Scope Ch 1 |
| 44 | Scope Ch 2 |
| 45 | Scope Ch 3 |
| 46 | Scope Ch 4 |
| 47 | Temp Bearing A |
| 48 | Temp Bearing B |
| 49 | Temp Gearbox |
| 50 | Temp Gearbox B |
| 51 | Temp Gearbox Bearing |
| 52 | Temp Generator 1 |
| 53 | Temp Generator 2 |
| 54 | Temp Gen Cooling Air |
| 55 | Temp Nacelle |
| 56 | Temp Outside |
| 57 | Temp Shaft Bearing |
| 58 | Torque, Actual Value |
| 59 | Torque, Set Value |
| 60 | Tower Acceleration |
| 61 | Tower Deflection |
| 62 | T-Transformer 1 |
| 63 | T-Transformer 2 |
| 64 | T-Transformer 3 |
| 65 | Voltage Phase A-N |

TABLE 1-continued

| Ch | Signal |
|---|---|
| 66 | Voltage Phase B-N |
| 67 | Voltage Phase C-N |
| 68 | Wind Deviation 1 sec |
| 69 | Wind Deviation 10 sec |
| 70 | Wind Speed |

Each of the points in Table 1 listed will be averaged using one of four methods. The first method is the linear average of the data, categorized by the code $\{1/N*sum(values)\}$. The second method is the average linear angle for angle-based variables. This method takes into account that zero degrees equals a three hundred and sixty degree wrap around for angles. The third method is the calculation for the power factor of the data represented by (cos phi). The third method effectively calculates the average of the arccosine of each of the data values during the interval. The value returned is the cosine of this average. The fourth method is the end of interval values. For this method, the last value captured during the specific interval is returned.

The application creates a pcode file entitled compresseddatalog.pcode, which specifies configuration information for the CDL 10. The code for the pcode file reads:

```
class cCdlConfig
{
public:
   cPcodeRecordHeader   mRecordHeader;
   unsigned short int   mMaxCdlDays;       // 1-30,
default 14
   unsigned short int   mIntervalMinutes;  // 1-60,
default 10
   unsigned short int   mCdlLogPercentage; // 1-100
}
```

In the log file 16, the data logs are deleted after being stored for 14 days in the computer by default, and 10 minutes of data are stored by default during a compression interval. However, anywhere from 1 to 60 minutes may be stored during a compression interval. Log files 16 are maintained until it is necessary to purge the files for more storage. However, the log files 16 are also purged if the time limit is exceeded or the storage limit is exceeded. For example, the time limit may be set for 14 days. If it is necessary to purge log files 16 because the storage space required exceeds the percentage of log partition available for the data, then an algorithm is used to systematically delete the log files 16 until adequate storage space is sufficient. When managing the log files 16, the oldest SecResolution log files 16 are purged one by one until storage space is adequate or until only 12 hours of SecResolution log files 16 exist. If storage space is still inadequate, then MinAna log files 16 are purged one by one until storage space is adequate or until MinAna log files 16 exist only for (mMaxCdlDays divided by 2) days. If storage space is still inadequate, then SecResolution log files 16 are purged one by one until storage space is adequate or until only one SecResolution log file 16 exists. Lastly, if storage space is still inadequate, then MinAna log files 16 are purged one by one until storage space is adequate or until only one MinAna log file 16 exists. To configure the variable information, the ControlST application creates the pcode file entitled redsymboltable.pcode, which reads:

```
struct cSymbol
{
    unsigned int       mSize;
    cToken             mToken;
    cDString           mName;
    unsigned char      mAttributes;
    unsigned short int mCdlAvgMthod;   // 0=none, else
1-4
    cDString           mDesc;
    cDisplayData       mDisplayData;
};
``` where mToken is the variable token identifier used to specify arrays. The arrays are available for web access. MName is the name of the variable, and the code mCldAvgMthod can have one of five variables associated with it; 0-4. If a 0 is used, then the variable is not used for CDL 10 averaging or 24 hour/1 second resolution logging. A 1 means that the average linear variable is used. A 2 means that the average linear angle is used. A 3 means that the average cosine phi is used. A 4 means that a data snapshot is used. The code mDesc is the point description string.

Data from the log files 16 is accessible via the web interface 18 when files are transferred to the web interface in an XML format 22. However, one skilled in the art would appreciate that any suitable file format may be used for transmission and storage. The user specifies the time range or sequence number and the method for obtaining and storing data 18. For example, a client may request data 18 by the MinAna limit information. In return, the client may receive information to indicate the oldest timetag, the newest timetag, the sequence number of the oldest record, and/or the sequence number of the newest record.

When the request for the limit information is made, an http:// interface is used to obtain and display the requested data. The IP string used for each request includes the following IP strings. For retrieving and displaying a summary of the 10 minute MinAna Data, the IP string 172.20.101.85/cqi-bin/mk6e-readdynamicxml?file=cdl.xml&type=0&data=0 is used. For retrieving and displaying a summary of the 1 second SecRes data, the IP string 172.20.101.85/cqi-bin/mk6e-readdynamicxml?file=cdl.xml&type=0&data=1 is used. For retrieving and displaying all MinAna data, the IP string 172.20.101.85/cqi-bin/mk6e-readdynamicxml?file=cdl.xml&type=4&data=0&p1=1&p2=2147483647 is used. The IP string 172.20.101.85/cqi-bin/mk6e-readdynamicxml?file=cdl.xml&type=4&data=1&p1=1&p2=2147483647 is used to retrieve and display all SecRes data, and the IP string 172.20.101.85/cqi-bin/mk6e-readdynamicxml?file=cdl.xml&type=6&data=0&p1=1&p2=2147483647 is used to retrieve and display all MinAna data. In addition, the time sequence number 172.20.101.85/cqi-bin/mk6e-readdynamicxml?file=cdl.xml&type=6&data=1&p1=1&p2=2147483647 is used to request and display all SecRes data. Further, the IP string 172.20.101.85/cqi-bin/mk6ereaddynamicxml?file=cdl.xml&type=3&data=1&p1=1&p2=2147483647&var=TestReal1 is used to display all data regarding the variable TestReal1.

In each of the code lines above, the IP string code is modified based on the specific data the user is requesting. For example, a sample IP code reads:

172.20.101.85/cqi-bin/mk6e-readdynamicxml?file=cdl.xml&type=6&data=1&p1=1&p2=2147483647

The portion of the IP string "172.20.101.85" should be replaced with the user's specific URL. The user URL may be a name or a number, however if a name is used, an entry must be made in %windir%\system32\drivers\etc\hosts file. The portion of the IP string that reads "data=1" (as in the sample above), dictates whether the MinAna data or SecRes data is used. If Data=0, then the 10 minute MinAna data is used. If the code includes "data=1", then the 1 second SecRes data is used. Still referring to the sample code, above, the "type=6" may be modified based on the user's specific requirements. The type may be specified to any number from 0 to 6. In addition the use of a P1 or P2 indicates the amount of data the user desires. For example, a 0 requests the summary of sequence numbers and timetags that have been stored, a 1, 2, 4, or 5 lists the records by timetag, and a 3 or 6 lists the records by the sequence number. When a 4 is used, P1 indicates the starting timetag and P2 indicates the ending timetag. When a 5 is used, P1 indicates the starting timetag and P2 indicates the count of the variables. When a 6 is used, P1 indicates the starting sequence number and P2 indicates the count of the variables. Further, a type 1 and 2 are the same as a type 4 or 5, but the name of the variable desired must be added to the IP string in the format: "&var=NameOfVariableDesired". A type 3 is the same as a type 6, and the variable the user desires must be added to the IP string as well. Still referring to the sample code above, the use of P1 and P2 indicates the starting timetag and the ending timetag. The variables used for P1 and P2 may be negative. When negative values are used for P1 and P2, the variables are given different meanings. Refer to Table 2 below for the meaning of the variable when negative numbers are used:

TABLE 2

| Case | Meaning when negative |
| --- | --- |
| P1 = starting timetag | Time in seconds before now |
| P2 = ending timetag | Time in seconds before now |
| P1 = starting sequence number | Sequence numbers prior to current sequence number |
| P2 = count | Count should not be negative. No data will be returned. |

For example, the sample IP string:

"cdl test/cqi-bin/mk6e-readdynamicxml?file=cdl.xml&type=3&data=0&p1=−9&p2=10&var=x"

requests data for the ten most recent 10 minute average intervals for a variable "x". When a user requests recent data, the user enters "data=1" and either P1 or P2 as negative. It is possible that the user requests data that has not been saved to the system. In such instances, the requests for this data cause the CDL to trigger a cache flush to the system so that all recent data is retrievable. The cache flush requests are ignored if they are repeated within 5 seconds of when the data was created or saved to the system.

There are several limits to the data that is stored. These limits include the start limit, end limit, start time stamp limit, end limit time stamp limit and interval minimum. The start limit provides the earliest sequence number saved in the CDL 10 files. The end limit provides the most recent sequence number saved in the CDL 10 files. The start time stamp limit is a non-negative integer that is the seconds field of the oldest available time value in the timestamp format. The end limit time stamp limit is a non negative integer in the seconds field of the newest available time value.

Once per second, data values for the points specified are gathered. The compressed results are stored in memory using several recursion methods. At the end of each interval, the one second data values for each point are analyzed and averaged. For each point listed in the table above, MinAna data that is calculated is an average value where each specified point uses one of four averaging methods as specified in the configuration and stored as a floating point or double. The average is calculated using a running average where the first data point of an interval and the average equals the single data value, represented by $M(1)=x(1)$. When additional data points are added to this interval, the average is calculated by $M(k)=M(k-1)+((x(k)-M(k-1))/k)$, where $M(k)$ is the average calculated after k data points and where $x(k)$ is the kth data value being averaged.

A standard deviation of the data is stored as a floating point or double. The standard deviation is calculated using a running average. For the first data point of an interval, the average equals the single data value $S(1)=0$. When additional data points are added to this interval, the S is calculated as $S(k)=S(k-1)+((x(k)-M(k-1))*(x(k)-M(k)))$ where $M(k)$ is the average calculated after k data points, and where $x(k)$ is the kth data value being averaged. After S has been calculated for all "n" data points in the interval, then the standard deviation, sigma, is calculated by $Sigma=sqrt(S(n)/(n-1))$, where sqrt (x) is the square root of x.

Minimum and maximum values are stored using the same data type as the variables. The total number of data values captured during the interval is stored as an unsigned integer. The type 2 data points take into account that 0 degrees equals 360 degrees wrap around for the angles. For each Linear-Angle datapoint, the direction vector is broken down into its corresponding x and y components. The x and y components have the average and standard deviation computed separately. After the average and standard deviation is calculated, a final resulting vector is determined from the x and y components computed. In the extremely unlikely event that the x and y components are both exactly zero, the resulting direction is arbitrarily assigned a direction of zero degrees. For type 3 data points, the average and standard deviation calculations are first calculated using $y=(abs(x)/x)*arccos(abs(x))$, where x is the type 3 value to be averaged. Then the average and standard deviation are calculated on y just as is done as described above. The resulting average is represented as $\bar{y}$. The final result is retransformed back using the equation $\bar{x}_{CosPhi}=(abs(\bar{y})/\bar{y})*cos(\bar{y})$ where $\bar{x}$ is the average value calculated. Type 4 data points are for end-of-interval values. The last value captured during the specified interval is returned as the "average". The standard deviation is always zero.

Data is stored to the flash file system every 10 minutes (or as configured) as a "Start of interval" delimiter, a "Sequence number" record, or a timetag specifying the time the interval ended. When each interval is complete, the average value, standard deviation, minimum, and maximum are calculated using the method configured for each point before the data is written to the flash file system.

If no CDL 10 log file exists, or if the most recent CDL 10 log file is full, or if the timetag of the current data corresponds to a different four-hour time interval than the timetag of the previous data, a new CDL 10 log file is created. Four-hour time intervals for data storage are 00:00:01 to 04:00:00, 04:00:01 to 08:00:00, 08:00:01 to 12:00:00, 12:00:01 to 16:00:00, 16:00:01 to 20:00:00, and 20:00:01 to 00:00:00. If a new CDL 10 log file is not created, new interval data will be appended to the most recent existing log file. A CDL 10 log file is considered full if it contains data for 4 hours or more (nominally 24 intervals). A CDL 10 MinAna log file is an ASCII file with a single header followed immediately by between 1 and 24 interval groups written. The header contains a summary of sequence numbers and timetag records found later in the file. An interval group always consists of a "Start of interval" record containing a "Sequence number" and "Timetag", multiple "Point data" records, and an "End of interval" record. Each of these records has a single upper-case ASCII character to define the record, followed by the character "|", followed by a record specific ASCII data. A "Start of interval" record begins with ASCII "S" and is followed by ASCII "|" and then an ASCII representation of the interval sequence number expressed in hexadecimal, followed by ASCII "|", followed by an ASCII representation of the timetag seconds expressed in hexadecimal followed by ASCII return.

The sequence number is unsigned, and may be selected starting at 0 and running to 4294967295. Once 4294967295 has been reached, the sequence is restarted to 0 again and incremented by one each time interval (nominal 10 minutes). The timetag represents UTC seconds since Jan. 1, 1970. The "V" record defines variable data for the interval. The "V" is followed by ASCII "|" and then an ASCII representation of the variable name, then followed by 7 data values, all shown in ASCII. The 7 values represent the compression method, the average value for the interval, the standard deviation, the minimum value, the maximum value, the count of data samples, and the valid count of data samples during the interval. Each field is separated by ASCII "|", expressed in decimal format. Finally, each interval is terminated by an "E" record, which is an ASCII "E" followed by ASCII "return".

The CDL 10 manages log files and the compressed data histories. Each log file is designed to hold four hours of compressed data. The size of the log files is a function of the amount of data stored during a four hour period. Nominal size of the log file is ~110 kb for a typical 75 point CDL 10 point list gathering data every 10 minutes. If the number of points is increased or if the time interval is decreased, then the file size increases. If the number of points is decreased or if the time interval is increased, then the file size decreases. Normally, the CDL 10 attempts to maintain 84 CDL MinAna log files for systems configured for 14 days storage (14 days*24 hours/day*¼ files/hours=84 files). This number is reduced if less than 14 days is specified or if space required in the controller's log partition exceeds the percentage allowed in the configuration.

The estimated storage space required for DD days of compressed data storage by VV data variables being stored, assuming the compression data interval is MM minutes is calculated by the code:

For file header:
87
For S record:
20
For V record:
62
For E record:
2
For each interval:
XX=20+(VV*62)+2
For each file:
FF=87+XX*240/MM For total CDL MinAna storage
TT=DD*6*FF
Example:
DD=14 days
VV=75 variables
MM=10 minutes
XX=20+(75*62)+2=4672
FF=87+4672*240/10=112215
TT=14*6*112215=94260609≈9 mb More actual space on the flash may be required due to file size roundup.

The external client makes requests for CDL 10 data by specifying the type of data to upload. There are seven formats for log queries of MinAna data. A RequestType zero request retrieves a summary of available data, giving timetag and sequence number limits. The returned data notifies the requester of the earliest and latest timetags stored by CDL 10 in the log partition. It also returns the lowest and highest sequence numbers stored, as well as the interval time in minutes used for data gathering. The other six requests retrieves specific data, where the requester specifies a time range or sequence number specification and variables desired, and CDL 10 returns the specified data if available.

The CDL 10 searches the log files for the appropriate range. While the CDL 10 process is searching a log file, all deletes of that log file are suspended. This prevents the logging system from deleting the log file while an upload is in progress. After a read from a log file has been completed, the CDL 10 process checks to see if the file has been marked for deletion. If it has, that file is deleted. If a search is made for data based on starting and ending timetags, RequestType 1 or 4 is made to find the starting point in the CDL 10 logs. The data is returned in order of sequence number until all files are accessed or until timetags are reached that are after the ending time specified. Data may not be returned using this method if time in the controller has been set backwards. RequestType 2 or 5 may be used to circumvent this problem.

For the data upload procedure, the CDL 10 process serves data to the web server. The CDL 10 process provides a resource manager that allows the CGI command to read well-formed XML that can be transferred to the outside world. This resource manager provides a read access that generates the XML. A devctl is provided that allows the CGI command to specify starting and ending timestamp parameters to use when transferring the data. Writes to a log are not stopped while an upload is in progress. The log files for the CDL 10 process can be as large as many kilo-bites, therefore it is not possible to read the entire file into memory for processing. When a request arrives to upload data, the CDL 10 process navigates to the appropriate area in each file and reads the file out in pieces for formatting and delivery to the requesting party. The navigation to the appropriate location in the log may be a lengthy procedure depending on the size of the log. Optimizations may be necessary to ensure that upload times are acceptable.

All MinAna data is stored in a single log directory, /LOG/CDL/MinAna. A unique variable name is assigned to each data record stored. This allows the process to differentiate the data in the log. In order to limit file sizes as much as possible, and limit data loss in the event of file corruption, a multi-file data-basing scheme is used. When a file reaches the end of a four hour interval or is storing four hours of CDL 10 data, a new file is be created and new log entries are written. This is continued until a predefined number of files are created. The number of files equals the number of days of CDL 10 storage configured by the TOOLBOXST application times six. When the last file reaches its maximum size, a check is made to see if an upload is in progress from the 1.sup.st file. If no upload is in place, the 1.sup.st file will be deleted. In the event that an upload is in progress from the 1.sup.st file when a delete is required, the upload will be deleted by the uploading thread after the upload is complete. The CDL 10 process maintains indexing information from each of the files. This information defines the earliest timestamp in the file, the latest timestamp in the file and the range of sequence numbers present. This information allows the CDL 10 process to quickly go to the appropriate file when a data upload has been requested.

Log files are ordered using the name of the file, which includes an index. For example, code:

MinAna_00000001, MinAna_00000002, . . . MinAna_ffffffff may be used to order a log file. The index increments until it reaches ffffffff, at which point the index is reset to 00000001.

Once per second, data values for the points are gathered at a one hertz rate, and the uncompressed results are stored in memory. It is known by those skilled in the art that any other suitable rate may be used. A periodic flush write to flash memory occurs at least once every 10 minutes. The data includes a "Start of interval" delimiter, a "Sequence number" record, and a Timetag, time in seconds UTC time since Jan. 1, 1970. Finally, there is a delimiter specifying the end of record.

A CDL 10 SecResolution log file is an ASCII file with a single header followed immediately by between 1 and ~1200 time groups written. The header contains a summary of sequence numbers and timetag records found later in the file. The CDL 10 manages the log files that need the compressed data histories. Each log file is designed to hold 20 minutes of compressed data. The size of the log files is a function of the amount of data stored during a 20 minute period. Nominal size of the log file is 1784 kb for a typical 75 point CDL 10 point list. If the number of points is increased, then this file size increases. If the number of points is decreased, then this file size decreases. Normally, CDL 10 maintains 72 CDL SecResolution log files for systems configured for 24 hour storage (24 hours/day*3 files/hour=72 files). This number is reduced if space required in the controller's log partition exceeds the percentage allowed in the configuration.

The estimated storage space required for 1 day of data storage by VV data variables being stored, assuming 20 minutes per data file, is approximately determined by:
For file header:
142 bytes
For S record:
20 bytes
For V record:
20 bytes
For E record:
2 bytes
For each interval:
XX=20+(VV*20)+2
For each file:
FF=142+XX*20*60
For total CDL MinAna storage
TT=3*24*FF
Example:
VV=75 variables
XX=20+(75*20)+2=1522
FF=142+1522*20*60=1826542≈1784 kb
TT=3*24*1837342=131511024≈125 mb More actual space on the flash is required due to file size roundup.

An external client makes requests for CDL 10 data by specifying the type of data to upload. There are seven formats for log queries of SecResolution data. A RequestType zero request retrieves a summary of available data, giving timetag and sequence number limits. The returned data lets the requester know the earliest and latest timetags stored by CDL 10 in the log partition. It also returns the lowest and highest sequence numbers stored, as well as the interval time in minutes used for data gathering. The other six requests retrieve specific data. The requester specifies a time range or sequence number specification and variables desired, and the CDL 10 returns the specified data if available. The CDL 10 searches the log files for the appropriate range. While the CDL 10 process is searching a log file, all deletes of that log file are suspended. This prevents the logging system from deleting from the log file while an upload is in progress. After a read from a log file has been completed, the CDL 10 process checks to see if the file has been marked for deletion. If it has, that file is then deleted. If a search is made for data based on starting and ending timetags, RequestType 1 or 4, a search is made to find the starting point in the CDL 10 logs and data is returned in order of sequence number until all files are accessed or until timetags are reached that are after the ending time specified. Data may not be returned using this method if time in the controller has been set backwards. RequestType 2 or 5 may be used to circumvent this problem.

All SecResolution data is stored in a single log directory, /LOG/CDL/SecRes. A unique variable name is assigned to each data record stored. This allows the process to be able to differentiate the data in the log. In order to limit file sizes as much as possible and limit data loss in the event of file corruption, a multi-file data-basing scheme is used. When a file reaches the end of a 20 minute interval or is storing 20 minutes of CDL 10 data, a new file is created and new log entries are written to the new file. This continues until a predefined number of files are created, preferably 72 files. When the last file reaches its maximum size, a check is made to see if an upload is in progress from the $1^{st}$ file. If no upload is in place, the $1^{st}$ file is deleted. In the event that an upload is in progress from the $1^{st}$ file when a delete is required, it is deleted by the uploading thread after the upload is complete. Log files are ordered using the name of the file, which includes an index. For example, SecRes_00000001.log, SecRes_00000002.log, SecRes_ffffffff.log. The index is incremented until it reaches ffffffff, when it is then reset to 00000001.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A data storage system for a wind turbine generator, the data storage system comprising:
    a controller configured to communicate with a wind turbine generator and to gather and compress wind turbine generator performance data, the controller comprising an online operation and an offline operation, the online operation requiring access to a networked system to store or retrieve wind turbine generator performance data, the offline operation not requiring access to a networked system to store or retrieve wind turbine generator performance data;
    a display configured to display the compressed data; and
    a processor disposed in the controller, the processor having a plurality of data stores to store wind turbine generator performance data compressed by the controller;
    wherein the controller, display and processor are in communication with each other and the compressed wind turbine generator performance data is stored in the controller in the form of a compressed data log, the compressed data log being accessible by the controller when performing the offline operation;
    wherein the data corresponds to a signal from one or more of a nacelle position and a nacelle revolution.

2. The data storage system of claim 1 wherein the controller is a computer and the display is a monitor.

3. The data storage system of claim 2 wherein the compressed wind turbine generator performance data is available in a webpage display.

4. The data storage system of claim 2 wherein the processor has two data stores.

5. The data storage system of claim 3 wherein the data is statistical summary information comprising at least one of average, standard deviation, minimum and maximum values.

6. The data storage system of claim 4 wherein the two data stores are a MinAna data store and a SecResolution data store.

7. The data storage system of claim 4 wherein the data is stored with a name, value and time tag for easy retrieval.

8. The data storage system of claim 6 wherein the MinAna data store comprises data from an average compressed historical data averaged over a minimum 1 minute interval and a maximum 60 minute interval.

9. The data storage system of claim 6 wherein the SecResolution data store is a one second production data that is captured, stored and time tagged at a predetermined rate.

10. The data storage system of claim 6 wherein the data store has a capacity to store a maximum of 30 days worth of data.

11. The data storage system of claim 9 wherein the predetermined rate is one hertz.

12. A data storage method comprising the steps of:
    providing a controller configured to communicate with a wind turbine generator and to gather and compress wind turbine generator performance data, the controller comprising an online operation and an offline operation, the online operation requiring access to a networked system to store or retrieve wind turbine generator performance data, the offline operation not requiring access to a networked system to store or retrieve wind turbine generator performance data, the controller comprising a processor disposed therein, the processor being in communication with the controller and having a plurality of data stores to store wind turbine generator performance data compressed by the controller;
    providing a display in direct communication with the controller;
    performing the offline operation, the offline operation comprising:
    storing a wind turbine generator performance data set at a predetermined rate and in predetermined increments in the controller;
    compressing the wind turbine generator performance data set into at least one manageable data stores;
    managing the at least one manageable data store to provide current and recent data;

displaying the at least one data store on the display at a user request; and communicating wind turbine generator performance data between the controller, display and the at least one data store;

wherein the data corresponds to a signal from one or more of a nacelle position and a nacelle revolution.

13. The method of claim 12 wherein the controller and display are a computer and monitor of a computer network.

14. The method of claim 13 wherein the step of compressing the wind turbine generator performance data set into at least one manageable data store comprises compressing the data set into a MinAna data store and a SecResolution data store.

15. The method of claim 13 wherein step of storing the wind turbine generator performance data set at a predetermined rate further comprises storing the data set at a one hertz rate.

16. The method of claim 13 wherein the step of storing the wind turbine generator performance data set at a predetermined increment further comprises storing the data set in a twenty four hour increment.

17. The method of claim 13 wherein the step of managing the at least one manageable data store to provide current and recent data further comprises deleting some data after it has been stored for a predetermined amount of time.

18. The method of claim 13 wherein the step of storing the wind turbine generator performance data set includes storing a wind turbine generator performance data set that comprises at least one of the group comprising an average of data values, a standard deviation of data values, a minimum of data values and a maximum of data values.

19. The method of claim 17 wherein the step of managing the at least one manageable data store to provide current and recent data further comprises gathering new data after old data has been deleted.

20. The method of claim 17 wherein the predetermined amount of time is twenty four hours.

* * * * *